(12) United States Patent
Gadre et al.

(10) Patent No.: US 6,494,679 B1
(45) Date of Patent: Dec. 17, 2002

(54) APPARATUS AND METHOD FOR ROTOR DAMPING

(75) Inventors: Aniruddha Dattatraya Gadre; Bharat Sampathkumaran Bagepalli, both of Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/528,533

(22) Filed: Mar. 20, 2000

Related U.S. Application Data (60) Provisional application No. 60/147,249, filed on Aug. 5, 1999.

(51) Int. Cl.[7] .................................................. F01D 5/10
(52) U.S. Cl. .................... 416/145; 416/190; 416/500
(58) Field of Search ................................ 416/145, 144, 416/80, 500, 219 R, 220 R, 193 A, 190; 74/573 R, 573 F (56) References Cited

U.S. PATENT DOCUMENTS

| 2,962,259 | A | * | 11/1960 | Bishop ........................ 416/500 |
| 3,181,835 | A | * | 5/1965 | Davis .......................... 416/145 |
| 3,677,662 | A | * | 7/1972 | Cronstedt .................... 416/500 |
| 3,888,601 | A | * | 6/1975 | Glassburn .................... 416/500 |
| 4,294,135 | A | * | 10/1981 | Tameo ...................... 74/573 R |
| 4,482,297 | A | * | 11/1984 | Mosimann et al. ......... 416/500 |
| 5,074,723 | A | * | 12/1991 | Massa et al. ............. 74/573 R |
| 5,256,035 | A | * | 10/1993 | Norris et al. ........... 416/220 R |

* cited by examiner

Primary Examiner—F. Daniel Lopez
Assistant Examiner—Richard Woo
(74) Attorney, Agent, or Firm—Lester Hale; Donald S. Ingraham (57) ABSTRACT

A rotor, such as a rotor of an aircraft gas turbine engine, uses damper-ring devices for damping unwanted rotor vibrations. One device has inner and outer damper rings with the outer damper ring providing ring-rotor frictional damping only at large vibrational amplitudes and with the inner and outer damper rings providing inter-ring frictional damping at both small and large vibrational amplitudes. Other devices include a damper ring and a viscoelastic layer, a hollow damper ring containing particulate matter, and a damper ring in the form of a cable made of twisted single-wire strands.

15 Claims, 7 Drawing Sheets

APPARATUS AND METHOD FOR ROTOR DAMPING

This application claims the benefit of U.S. Provisional Application No. 60/147,249, filed Aug. 5, 1999, the entire content of which is hereby incorporated by reference in this application.

BACKGROUND OF THE INVENTION

The present invention relates generally to rotors, and more particularly to damping unwanted rotor vibrations.

Rotors are the rotatable portions of rotary machines, and rotary machines include, without limitation, X-ray tubes, a centrifugal compressor, a steam turbine (including a turbine portion thereof) used by a power utility company, and a gas turbine (including a compressor portion or a turbine portion thereof) used as an aircraft engine or used by a power utility company.

It is known to dampen vibrations of a rotor of an aircraft gas turbine engine by installing a split-ring damper in a damper-ring groove of the rotor. The rotor may include rotor blades attached to, and extending radially-outward from, a shaft, or the rotor may be a monolithic blisk having shaft and blade portions. The damper-ring groove is a circumferential, radially-inward-facing groove on the shaft or shaft-portion of the rotor with the groove being coaxially aligned with the longitudinal axis of the rotor. To prevent longitudinal motion of the split-ring damper, the groove may have two longitudinally-spaced-apart side walls or, in the case of a tapered shaft, the groove may have a single side wall. The split-ring damper is a metallic ring having a single, radially-aligned through-cut. The weight, flexibility (Young's modulus), and surface friction characteristics of the split-ring damper are chosen (by experiment, computer analysis, and/or closed-form equations) to provide the most damping for a particular amplitude of one rotor vibrational mode of one natural vibrational frequency which typically corresponds to an expected maximum amplitude of a dominant vibrational mode of an excitation frequency which is closest to steady-state rotor operation. The split-ring design of the damper provides ease of installation in the damper-ring groove and allows frictional damping (by microslippage) between the outer circumferential surface of the split-ring damper and the rotor. Such damping is less effective or ineffective to dampen vibrations below the expected maximum amplitude, such as small-amplitude vibrations which may lead to fatigue failure of the rotor. What is needed is improved rotor damping.

BRIEF SUMMARY OF THE INVENTION

In a first embodiment of the invention, apparatus for damping a rotor includes at least a first and a second damper ring wherein the outer diameter of the second damper ring is generally equal to the inner diameter of the first damper ring. In a second embodiment, a rotor assembly includes a rotor having a damper-ring groove and includes the previously-described at least first and second damper rings positioned in the damper-ring groove. A first expression of a method of the invention obtains and positions the previously-described at least first and second damper rings in the damper-ring groove of a rotor.

In a third embodiment of the invention, apparatus includes a damper-ring assembly having an inner damper ring, an outer damper ring, and a viscoelastic layer positioned radially between and bonded to the inner and outer damper rings. In a fourth embodiment, a rotor assembly includes a rotor having a damper-ring groove and includes the previously-described damper-ring assembly positioned in the damper-ring groove.

In a fifth embodiment of the invention, a rotor assembly includes a rotor having a damper-ring groove and includes a damper-ring assembly positioned in the damper-ring groove, wherein the damper-ring assembly has an outer damper ring and has a viscoelastic layer positioned radially between and bonded to the outer damper ring and the rotor.

In a sixth embodiment of the invention, a damper ring includes a generally ring-shaped housing having a hollow portion and includes particulate matter located within the hollow portion of the housing. In a seventh embodiment, a rotor assembly includes a rotor having a damper-ring groove and includes the previously-mentioned damper ring disposed in the damper-ring groove.

In an eighth embodiment of the invention, apparatus includes single-wire strands twisted together to define a cable, wherein the cable has a shape of a split ring. In a ninth embodiment, a rotor assembly includes a rotor having a damper-ring groove and includes the previously-described cable positioned in the damper-ring groove.

Several benefits and advantages are derived from the invention. The known single-ring design of the prior art provides frictional damping between the outer circumferential surface of the ring and the rotor only for large-amplitude vibrations. In an at-least-two-ring embodiment of the invention, the outer circumferential surface of the inner ring and the inner circumferential surface of the outer ring undergo microslippage and hence frictional damping in response to small-amplitude vibrations, and, for large-amplitude vibrations, there is added thereto the frictional damping of the outer circumferential surface of the outer ring with the rotor. Engineering analysis shows that dividing one ring into two or more concentric rings (of the same total weight as the one ring) provides more damping over a larger range of vibrational amplitudes than does the one ring. In a viscoelastic-layer embodiment of the invention, the viscoelastic layer provides damping in the form of viscous damping for smaller-amplitude vibrations, and, for larger-amplitude vibrations, there is added thereto the frictional damping of ring-rotor contact or ring-ring contact. In a hollow-damping-ring embodiment of the invention, the particulate matter provides particulate frictional damping for smaller-amplitude vibrations, and, for larger-amplitude vibrations, there is added thereto the frictional damping of the ring's housing with the rotor. In a cable embodiment of the invention, the twisted single-wire strands provide frictional damping between strands for smaller-amplitude vibrations, and, for larger-amplitude vibrations, there is added thereto the frictional damping of the cable with the rotor.

DETAILED DESCRIPTION OF THE INVENTION

Figure 1:
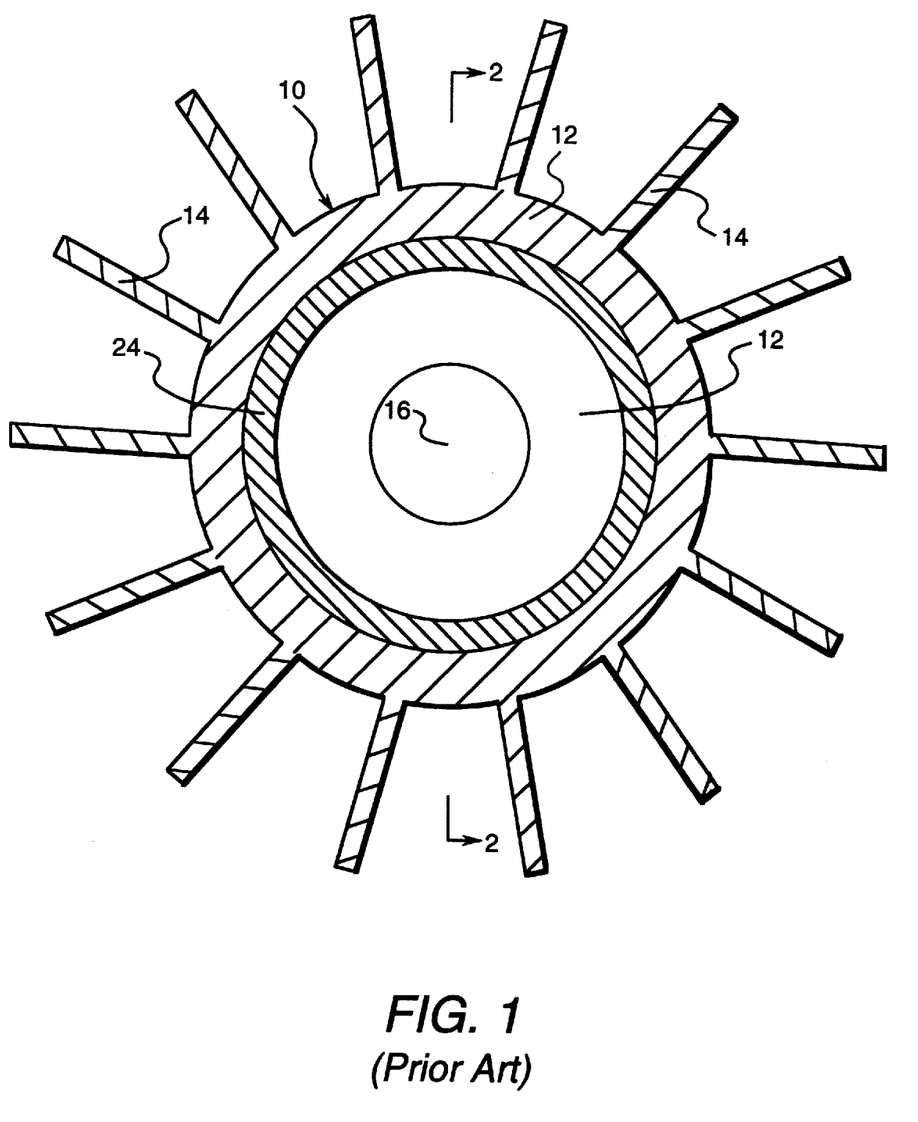
FIG. 1 is a cross-sectional view of a prior-art rotor and damper ring taken by a cutting plane which is oriented perpendicular to the longitudinal axis of the rotor and which passes through the damper ring.
Figure 2:
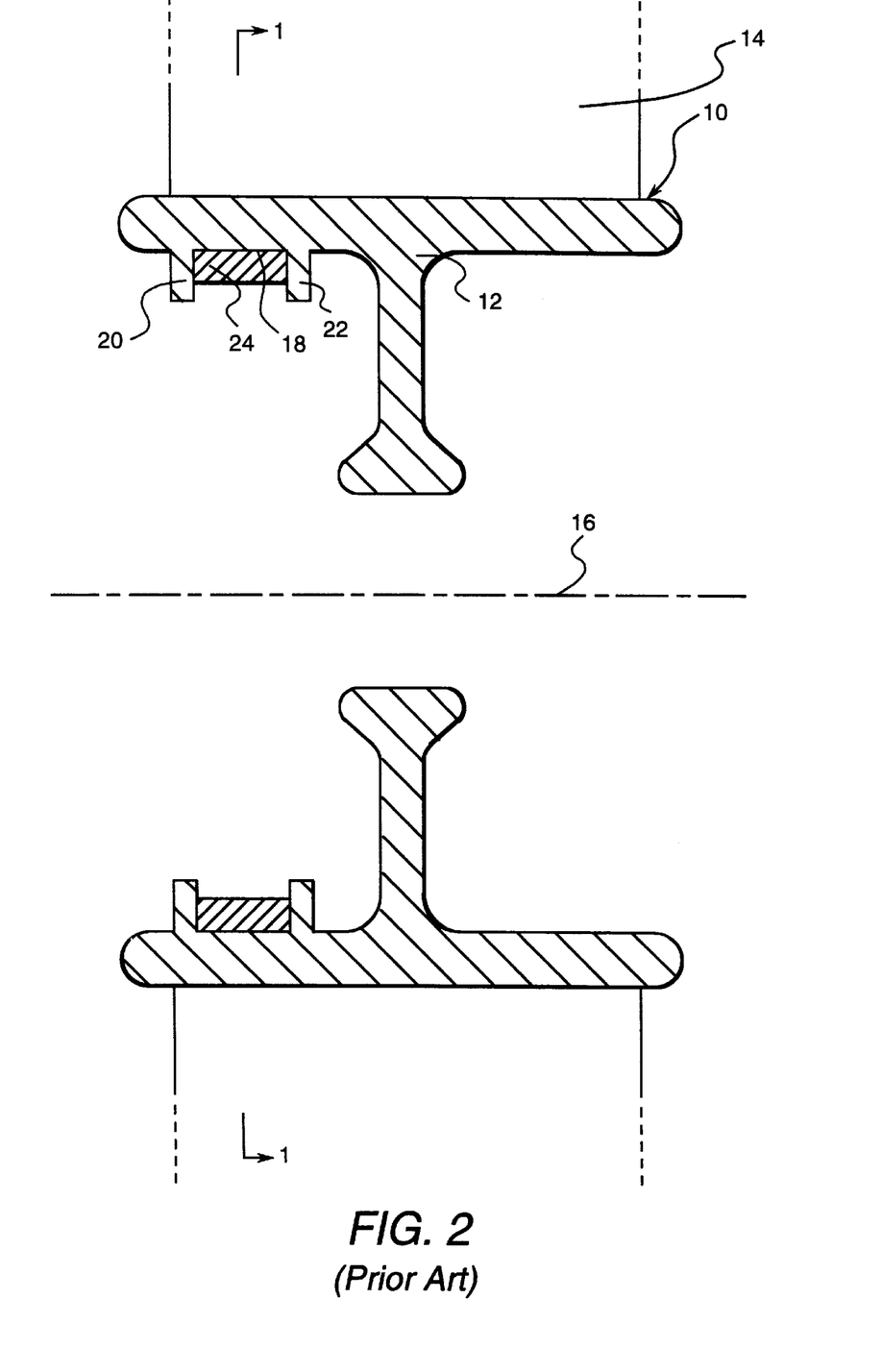
FIG. 2 is a cross-sectional view of the rotor and damper ring of FIG. 1 taken along lines 2—2 of FIG. 1.

Referring now to the drawings, wherein like numerals represent like elements throughout, FIGS. 1–2 show a prior-art rotor 10, of an aircraft gas turbine engine, including a shaft portion 12 and blade portions 14. Rotor 10 is of monolithic construction (i.e., a blisk), although different prior-art rotors are designed wherein individual rotor blades are attached to a separate rotor. The rotor 10 has a longitudinal axis 16 and is shown with a damper-ring groove 18 having first and second side walls 20 and 22. A damper ring 24 is shown installed in the damper-ring groove 18. It is noted that, for a tapered shaft or shaft portion, only one side wall is needed to prevent longitudinal movement of a damper ring in a damper-ring groove, as is known to the artisan.

Figure 3:
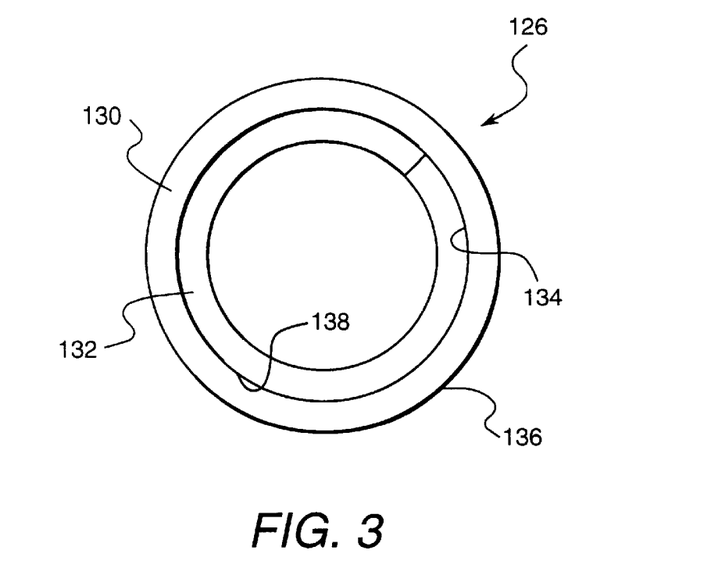
FIG. 3 is a front elevational view of a first embodiment of the invention showing apparatus including first and second damper rings for damping a rotor.
Figure 4:
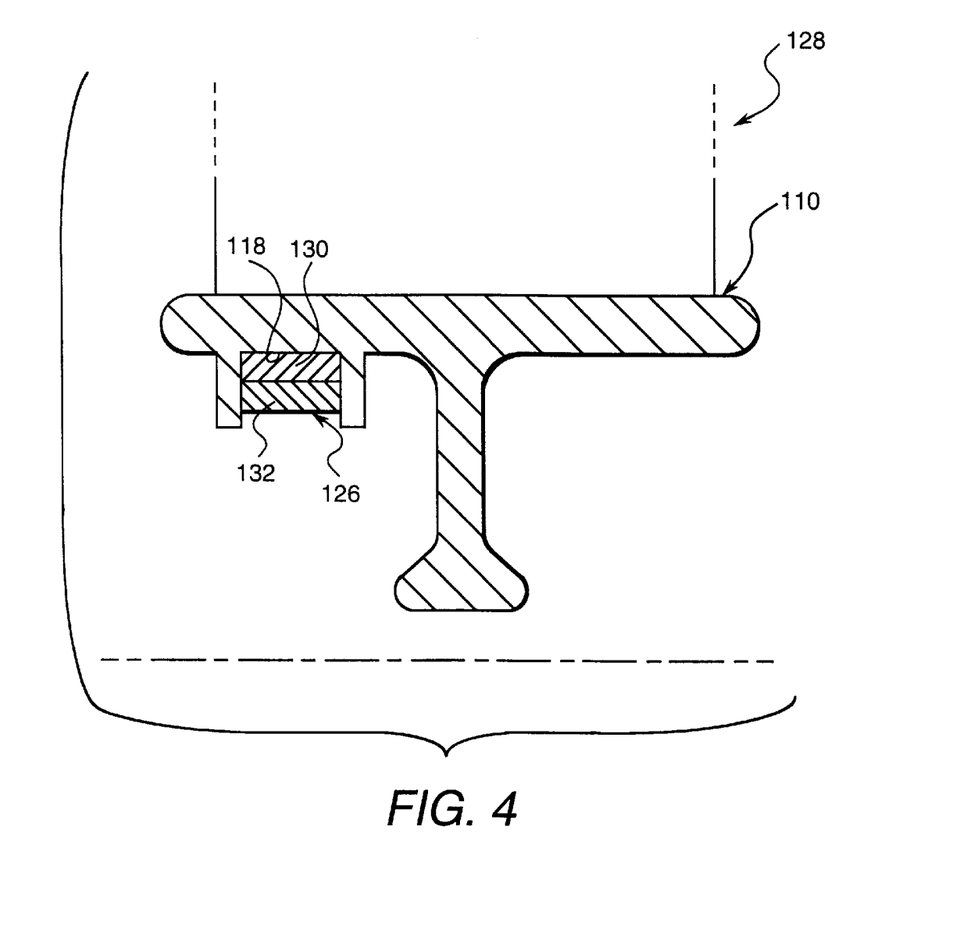
FIG. 4 is an above-axis portion of a view, as in FIG. 2, but of a second embodiment of the invention showing a rotor assembly including a rotor and the first and second damper rings of FIG. 3.

An embodiment of apparatus 126 of the invention is shown in FIG. 3, and an embodiment of a rotor assembly 128 of the invention is shown in FIG. 4 which includes the apparatus 126 of FIG. 3. The apparatus 126 is for damping a rotor 110 undergoing a vibration, wherein the rotor 110 has a damper-ring groove 118. The apparatus 126 includes at least a first and a second damper ring 130 and 132. The first damper ring 130 is disposable in the damper-ring groove 118, has an inner diameter and an inner circumferential surface 134, and has an outer diameter and an outer circumferential surface 136. The second damper ring 132 is disposable in the damper-ring groove 118, has an outer diameter, and has an outer circumferential surface 138. The outer diameter of the second damper ring 132 is generally equal to the inner diameter of the first damper ring 130. The inner circumferential surface 134 of the first damper ring 130 and the outer circumferential surface 138 of the second damper ring 132 unattachedly contact each other when the first and second damper rings 130 and 132 are disposed in the damper-ring groove 118. The first and second damper rings 130 and 132 experience frictional damping at the contact of the second damper ring 132 with the first damper ring 130 when the rotor 110 undergoes the previously-mentioned vibration. In one design, the first and second damper rings 130 and 132 are split rings. In one example, the outer circumferential surface 136 of the first damper ring 130 unattachedly contacts the rotor 110 when the first and second damper rings 130 and 132 are disposed in the damper-ring groove 118, and the first damper ring 130 experiences frictional damping at the contact of the first damper ring 130 with the rotor 110 when the rotor 110 undergoes the previously-mentioned vibration.

The rotor assembly 128, of the embodiment of the invention shown in FIG. 4, includes a rotor 110 having a damper-ring groove 118 and includes at least a first and a second damper ring 130 and 132. The first damper ring 130 is disposed in the damper-ring groove 118 and has an inner circumferential surface 134 and an outer circumferential surface 136. The second damper ring 132 is disposed in the damper-ring groove 118 and has an outer circumferential surface 138. The inner circumferential surface 134 of the first damper ring 130 and the outer circumferential surface 138 of the second damper ring 132 unattachedly contact each other. In one design, the first and second damper rings 130 and 132 are split rings. In one application, the split in the first damper ring 130 is radially offset with respect to the split in the second damper ring 132 at the time of installation, such radial offset being shown in FIG. 3. In one example, the outer circumferential surface 136 of the first damper ring 130 unattachedly contacts the rotor 110. It is noted that the rotor is not limited to a rotor of an aircraft gas turbine engine, and may be a rotor of any machine such as, but not limited to, an X-ray tube, a centrifugal compressor, a steam turbine (including a turbine portion thereof) used by a power utility company, and a gas turbine (including a compressor portion or a turbine portion thereof) used by a power utility company.

One technique for designing first and second (or more) damper rings 130 and 132 is to first consider the concentric rings as a single thick ring. Then, the single thick ring is designed using the known techniques of designing a prior-art single damper ring for a rotor having a damper-ring groove, wherein the single thick ring undergoes significant frictional damping with the rotor for an expected maximum amplitude of vibration. Next, the single thick ring is broken into first and second (or more) damper rings 130 and 132, using the same techniques for designing the single thick ring, such that the second (inner) ring undergoes microslippage with respect to the first (outer) ring and the first (outer) ring undergoes microslippage with respect to the rotor at the expected maximum amplitude of vibration and such that only the second (inner) ring undergoes microslippage with respect to the first (outer) ring for a smaller amplitude of vibration. This will provide significant frictional damping at lower vibrational amplitudes to reduce the risk of small-amplitude fatigue failure of the rotor where the known single-ring design provides no damping. This also will provide damping at the expected maximum amplitude of vibration with such damping being greater (because of the inter-ring microslippage of two or more rings) than that of the known single ring design of the prior art.

A first expression of a method of the invention is for damping a vibration of a rotor 110 having a damper-ring groove 118 and includes steps a) through d). Step a) includes obtaining a first damper ring 130 having an inner diameter. Step b) includes obtaining a second damper ring 132 having an outer diameter which is generally equal to the inner diameter of the first damper ring 130. Step c) includes disposing the first damper ring 130 in the damper-ring groove 118. Step d) includes disposing the second damper ring in the damper-ring groove 118 such that the inner circumferential surface 134 of the first damper ring 130 and the outer circumferential surface 138 of the second damper ring unattachedly contact each other and such that the first and second damper rings 130 and 132 experience frictional damping at the contact of the second damper ring 132 with the first damper ring 130 when the rotor undergoes the previously-mentioned vibration.

In one example, step a) includes obtaining a first damper ring 130 which is a split ring, and step b) includes obtaining a second damper ring 132 which is a split ring. In another example, the damper-ring groove 118 has a groove diameter, and step a) includes obtaining a first damper ring 130 having an outer diameter which is generally equal to the groove diameter of the damper-ring groove 118. In a further example, step c) includes disposing the first damper ring 130 in the damper-ring groove 118 such that outer circumferential surface 136 of the first damper ring 130 unattachedly contacts the rotor 110 and such that the rotor 110 and the first damper ring 130 experience frictional damping at the contact of the rotor 110 with the damper ring 130 when the rotor 110 undergoes the previously-mentioned vibration.

Figure 5:
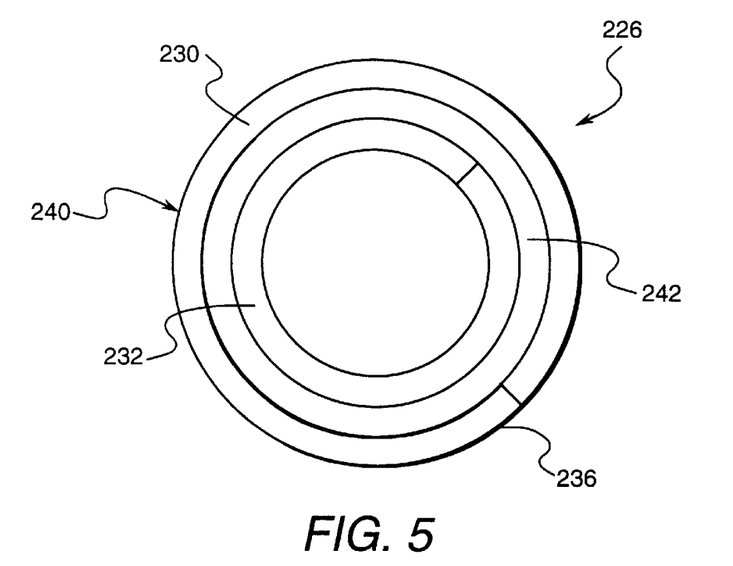
FIG. 5 is a view, as in FIG. 3, but of a third embodiment of the invention showing apparatus including a damper-ring assembly having two damper rings and an intervening viscoelastic layer.
Figure 6:
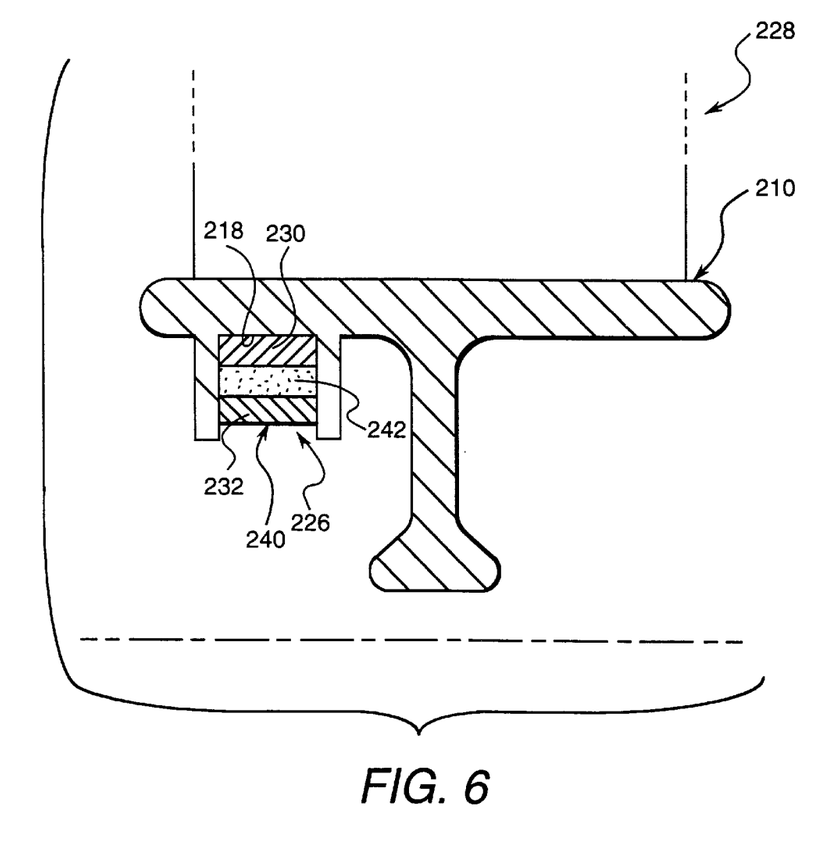
FIG. 6 is a view, as in FIG. 4, but of a fourth embodiment of the invention showing a rotor assembly including a rotor and the damper-ring assembly of FIG. 5.

Another embodiment of apparatus 226 of the invention is shown in FIG. 5, and an embodiment of a rotor assembly 228 of the invention is shown in FIG. 6 which includes the apparatus 226 of FIG. 5. The apparatus 226 is for damping a rotor 210 undergoing a vibration, wherein the rotor 210 has a damper-ring groove 218. The apparatus 226 includes a damper-ring assembly 240 having an inner damper ring 232, an outer damper ring 230, and a viscoelastic layer 242 disposed radially between and bonded to the inner and outer damper rings 232 and 230. Examples of viscoelastic materials suitable for the viscoelastic layer 242 include, without limitation, polymers and plastics. The damper ring assembly 240 is disposable in the damper-ring groove 218. In one design, the damper-ring assembly 240 is a split-ring assembly. In one application, the split in the inner damper ring 232 is radially offset with respect to the split in the outer damper ring 230, as seen in FIG. 5. In one example, the outer damper ring 230 has an outer circumferential surface 236 which unattachedly contacts the rotor 210 when the damper-ring assembly 240 is disposed in the damper-ring groove 218, wherein the rotor 210 and the outer damper ring 230 experience frictional damping at the contact of the outer damper ring 230 with the rotor 210 when the rotor 210 undergoes the previously-mentioned vibration, and wherein the outer and inner damper rings 230 and 232 experience viscous damping from the viscoelastic layer 242 when the rotor undergoes the previously-mentioned vibration.

The rotor assembly 228, of the embodiment of the invention shown in FIG. 6, includes a rotor 210 having a damper-ring groove 218 and includes a damper-ring assembly 240 disposed in the damper-ring groove 218. The damper-ring assembly 240 has an inner damper ring 232, an outer damper ring 230, and a viscoelastic layer 242 disposed radially between and bonded to the inner and outer damper rings 232 and 230. In one design, the damper-ring assembly 240 is a split-ring assembly. In one application, the split in the inner damper ring 232 is radially offset with respect to the split in the outer damper ring 230, such radial offset being shown in FIG. 5. In one example, the outer damper ring 230 has an outer circumferential surface 236 which unattachedly contacts the rotor 210. Viscoelastic layers can be designed by the artisan such that viscous damping is provided by the viscoelastic layer 242 at small (and large) amplitudes of vibration and such that frictional damping is provided between the outer damper ring 230 and the rotor 210 only at large amplitudes of vibration.

Figure 7:
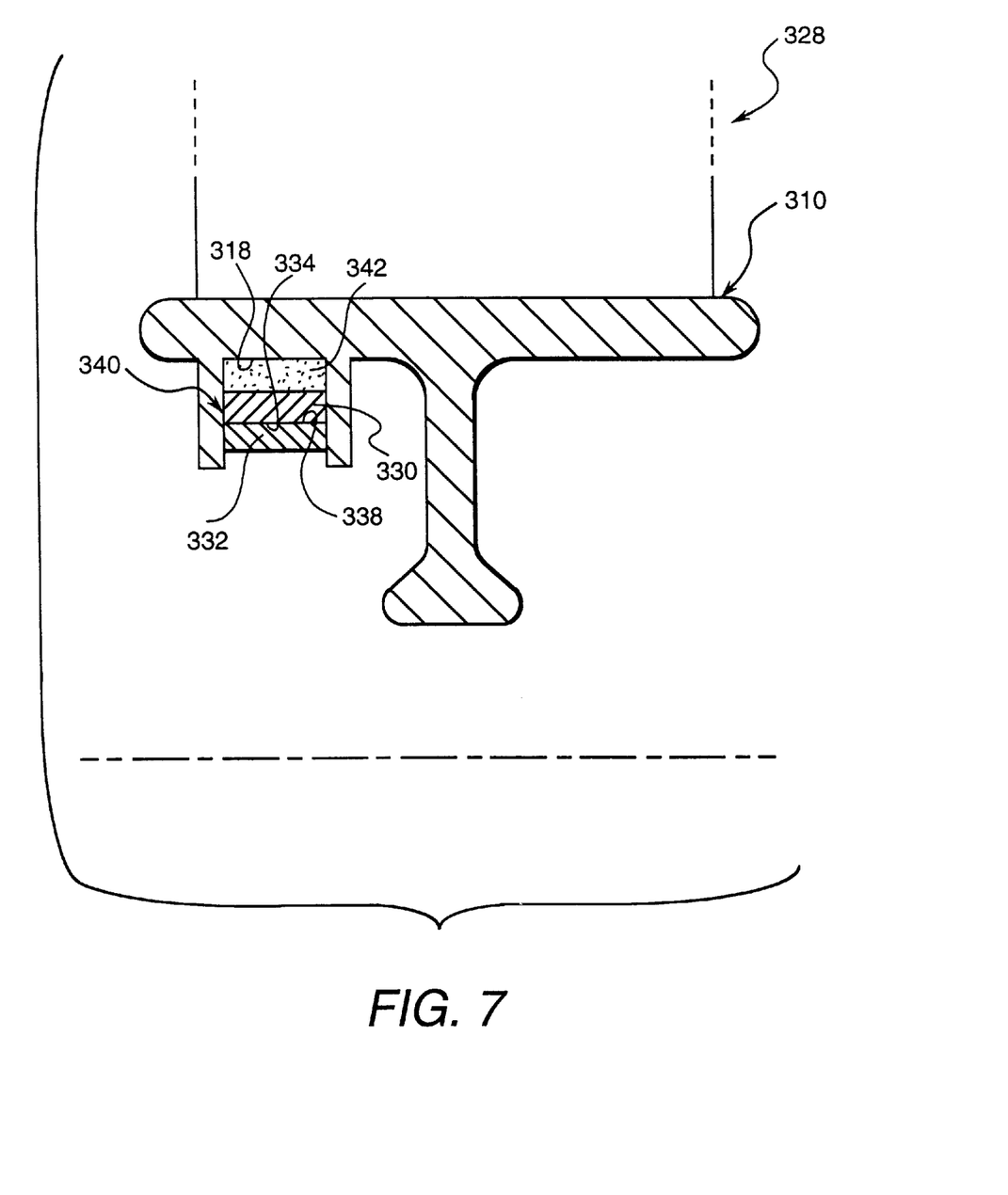
FIG. 7 is a view, as in FIG. 4, but of a fifth embodiment of the invention showing a rotor assembly including a rotor, an inner damper ring, and a damper-ring assembly having an outer damper ring and having a viscoelastic layer bonded to the rotor and to the outer damper ring.

In another embodiment of a rotor assembly 328 of the invention, as seen in FIG. 7, the rotor assembly 328 includes a rotor 310 having a damper-ring groove 318 and includes a damper-ring assembly 340 disposed in the damper-ring groove 318. The damper-ring assembly 340 includes an outer damper ring 330 and includes a viscoelastic layer 342 disposed radially between and bonded to the outer damper ring 330 and the rotor 310. In one example, the rotor assembly 328 also includes an inner damper ring 332 disposed in the damper-ring groove 318, wherein the outer damper ring 330 has an inner circumferential surface 334, wherein the inner damper ring 332 has an outer circumferential surface 338, and wherein the inner circumferential surface 334 of the outer damper ring 330 and the outer circumferential surface 338 of the inner damper ring 332 unattachedly contact each other. In one design, the damper-ring assembly 340 is a split-ring assembly, and the inner damper ring 332 is a split ring. Viscoelastic layers can be designed by the artisan such that viscous damping is provided by the viscoelastic layer 342 at small (and larger) amplitudes of vibration and such that frictional damping is provided between the rings 332 and 330 only at larger amplitudes of vibration.

Figure 8:
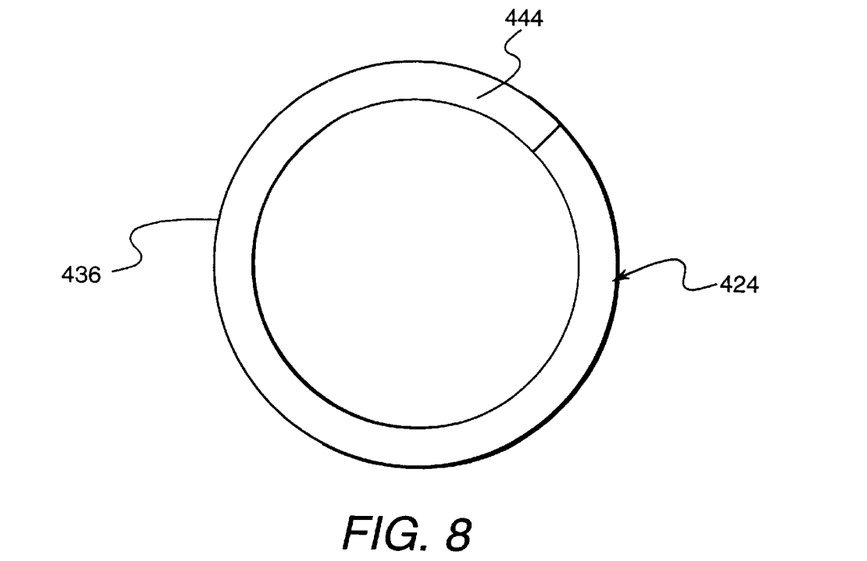
FIG. 8 is a view, as in FIG. 3, but of a sixth embodiment of the invention showing a damper ring having a hollow portion containing particulate matter.
Figure 9:
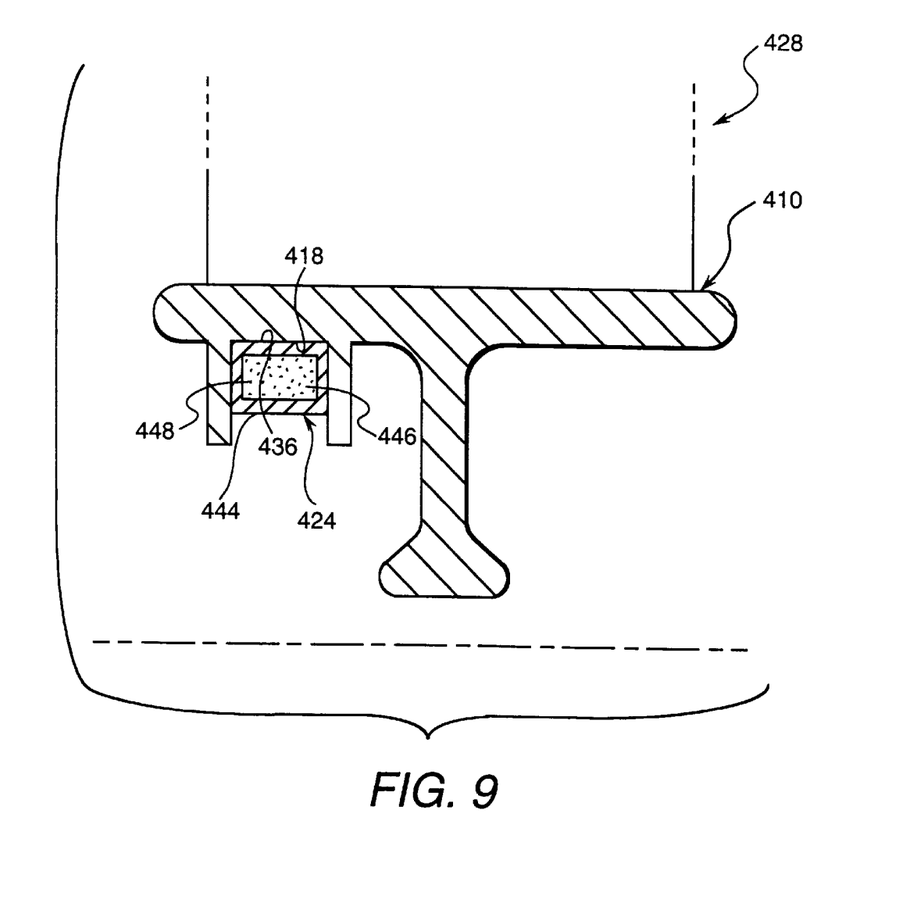
FIG. 9 is a view, as in FIG. 4, but of a seventh embodiment of the invention showing a rotor assembly including a rotor and the damper ring of FIG. 8

An embodiment of a damper ring 424 of the invention is shown in FIG. 8, and an embodiment of a rotor assembly 428 of the invention is shown in FIG. 9 which includes the damper ring 424 of FIG. 8. The damper ring 424 is for damping a rotor 410 undergoing a vibration, wherein the rotor 410 has a damper-ring groove 418. The damper ring 424 includes a generally ring-shaped housing 444 disposable in the damper-ring groove 418 and having a hollow portion 446, and the damper ring 424 includes particulate matter 448 disposed within the hollow portion 446 of the housing 444. For purposes of describing the invention, "particulate matter" is any matter comprising, consisting essentially of, or consisting of particles having a volume of less than ten cubic millimeters. Examples of particulate matter include, without limitation, sand, polymer pellets, metal powder, and ceramic powder. In one design, the housing 444 has a split-ring shape, and the hollow portion 446 has an annular shape which is generally coaxially aligned with the housing 444. In one example, the housing 444 has an outer circumferential surface 436, wherein the outer circumferential surface 436 of the housing 444 unattachedly contacts the rotor 410 when the housing 444 is disposed in the damper-ring groove 418.

The rotor assembly 428, of the embodiment of the invention shown in FIG. 9, includes a rotor 410 having a damper-ring groove 418 and includes a damper ring 424. The damper ring 424 includes a generally ring-shaped housing 444 disposed in the damper-ring groove 418 and having a hollow portion 446, and the damper ring 424 includes particulate matter 448 disposed within the hollow portion 446 of the housing 444. In one design, the housing 444 has a split-ring shape, and the hollow portion 446 has an annular shape which is generally coaxially aligned with the housing 444. In one example, the housing 444 has an outer circumferential surface 436, wherein the outer circumferential surface 436 of the housing 444 unattachedly contacts the rotor 410. The composition, particulate size, and total volume of the particulate matter 448 can be chosen by the artisan to provide frictional damping between particles at small (and large) amplitudes of vibration while providing frictional damping between the housing 444 and the rotor 410 only at large amplitudes of vibration.

Figure 10:
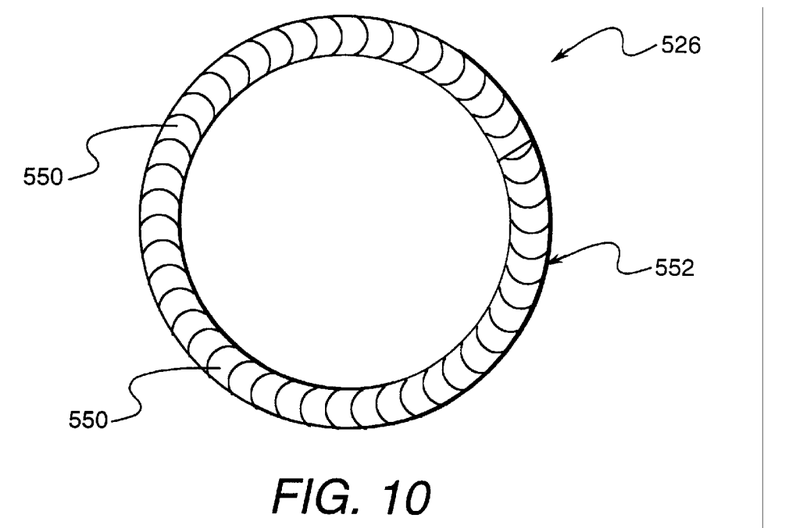
FIG. 10 is a view, as in FIG. 3, but of an eighth embodiment of the invention showing apparatus including single-wire strands twisted together to define a cable.
Figure 11:
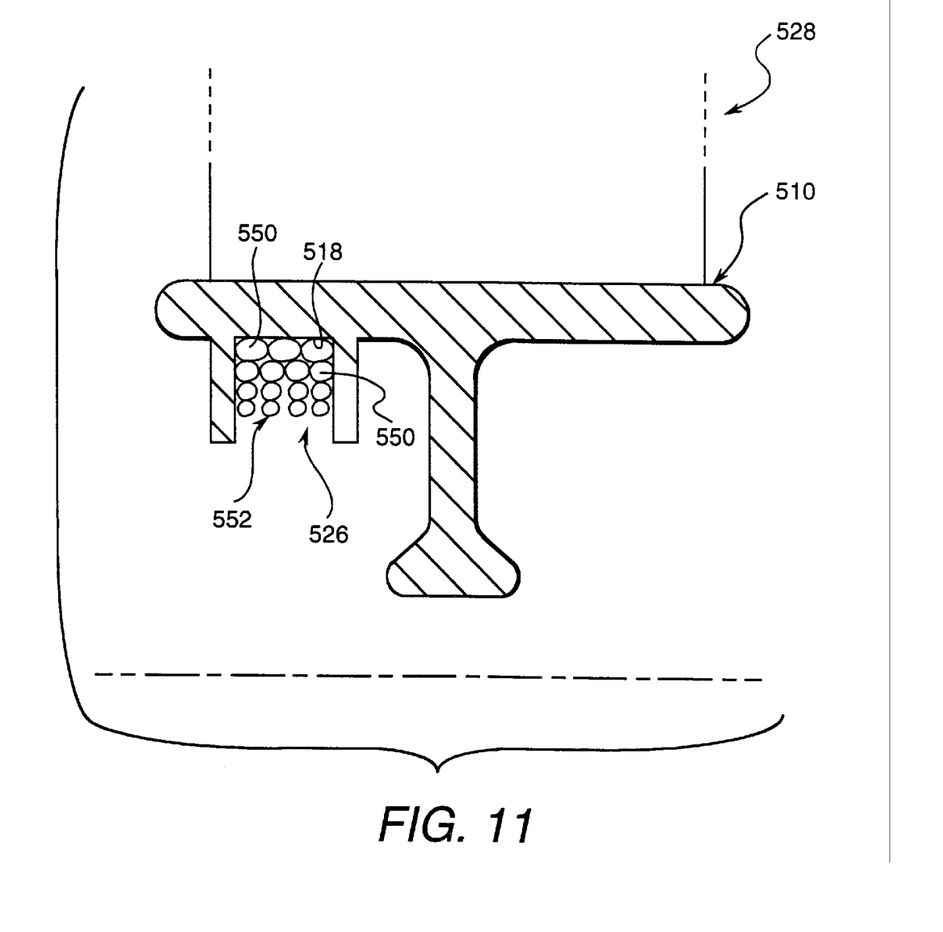
FIG. 11 is a view, as in FIG. 4, but of a ninth embodiment of the invention showing a rotor assembly including a rotor and the cable of FIG. 10.

Another embodiment of apparatus 526 of the invention is shown in FIG. 10, and an embodiment of a rotor assembly 528 of the invention is shown in FIG. 11 which includes the apparatus 526 of FIG. 10. The apparatus 526 is for damping a rotor 510 undergoing a vibration, wherein the rotor 510 has a damper-ring groove 518. The apparatus 526 includes a plurality of single-wire strands 550 twisted together to define a cable 552, wherein the cable 552 has a shape of a split ring, and wherein the cable 552 is disposable in the damper-ring groove 518. Examples of wire strands include, without limitation, steel wire strands and tungsten wire strands. In one design, at least some of the single-wire strands 550 unattachedly contact the rotor 510 when the cable 552 is disposed in the damper-ring groove 518.

The rotor assembly 528, of the embodiment of the invention shown in FIG. 11, includes a rotor 510 having a damper-ring groove 518 and includes a plurality of single-wire strands 550 twisted together to define a cable 552, wherein the cable 552 has a shape of a split ring, and wherein the cable 552 is disposed in the damper-ring groove 518. In one design, at least some of the single-wire strands 550 unattachedly contact the rotor 510. The number, size, composition, and surface friction characteristics of the wire strands 550 can be chosen by the artisan to provide inter-strand frictional damping at small (and large) amplitudes of vibration while providing frictional damping between the cable 552 and the rotor 510 only at large amplitudes of vibration.

As can be appreciated and accomplished by the artisan, the frictional or viscous damping of an inner ring can be designed to provide damping for another vibrational mode different from a dominant vibrational mode which is damped by an outer ring or to provide damping for a natural frequency of vibration separate from a natural frequency of vibration closest to steady-state conditions which is damped by the outer ring. The various described multi-ring, viscoelastic layer, particulate matter, and cable embodiments can be used mainly alone as previously-described. However, in some applications, such embodiment may be used in any combination or combinations, as can be practiced by those skilled in the art.

The foregoing description of several embodiments and an expression of a method of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

What is claimed is:

1. Apparatus for damping a rotor undergoing a vibration, said rotor having a damper-ring groove, and said apparatus comprising a damper-ring assembly including an inner damper ring, an outer damper ring, and a viscoelastic layer disposed radially between and bonded to said inner and outer damper rings, wherein said damper-ring assembly is disposable in said damper-ring groove.

2. The apparatus of claim 1, wherein said damper-ring assembly is a split-ring assembly.

3. The apparatus of claim 2, wherein said outer damper ring has an outer circumferential surface which unattachedly contacts said rotor when said damper-ring assembly is disposed in said damper-ring groove, wherein said rotor and said outer damper ring experience frictional damping at said contact of said outer damper ring with said rotor when said rotor undergoes said vibration, and wherein said outer and inner damper rings experience viscous damping from said viscoelastic layer when said rotor undergoes said vibration.

4. A rotor assembly comprising:
   a) a rotor having a damper-ring groove; and
   b) a damper-ring assembly disposed in said damper-ring groove and including an inner damper ring, an outer damper ring, and a viscoelastic layer disposed radially between and bonded to said inner and outer damper rings.

5. The rotor assembly of claim 4, wherein said damper-ring assembly is a split-ring assembly.

6. The rotor assembly of claim 5, wherein said outer damper ring has an outer circumferential surface which unattachedly contacts said rotor.

7. A rotor assembly comprising:
   a) a rotor having a damper-ring groove; and
   b) a damper-ring assembly disposed in said damper-ring groove and including an outer damper ring and a viscoelastic layer disposed radially between and bonded to said outer damper ring and said rotor.

8. The rotor assembly of claim 7, also including an inner damper ring disposed in said damper-ring groove, wherein said outer damper ring has an inner circumferential surface, wherein said inner damper ring has an outer circumferential surface, and wherein said inner circumferential surface of said outer damper ring and said outer circumferential surface of said inner damper ring unattachedly contact each other.

9. The rotor assembly of claim 8, wherein said damper-ring assembly is a split-ring assembly, and wherein said inner damper ring is a split ring.

10. A damper ring for damping a rotor undergoing a vibration, said rotor having a damper-ring groove, and said damper ring comprising:
    a) a generally ring-shaped housing disposable in said damper-ring groove and having a hollow portion; and
    b) particulate matter disposed within said hollow portion of said housing.

11. The damper ring of claim 10, wherein said housing has a split-ring shape.

12. The damper ring of claim 11, wherein said housing has an outer circumferential surface, and wherein said outer circumferential surface of said housing unattachedly contacts said rotor when said housing is disposed in said damper-ring groove.

13. A rotor assembly comprising:
    a) a rotor having a damper-ring groove; and
    b) a damper ring having:
       (1) a generally ring-shaped housing disposed in said damper-ring groove and having a hollow portion; and
       (2) particulate matter disposed within said hollow portion of said housing.

14. The rotor assembly of claim 13, wherein said housing has a split-ring shape.

15. The rotor assembly of claim 14, wherein said housing has an outer circumferential surface, and wherein said outer circumferential surface of said housing unattachedly contacts said rotor.

* * * * *